US012796659B2

(12) United States Patent
Hidalgo Gonzalez

(10) Patent No.: US 12,796,659 B2
(45) Date of Patent: Nov. 17, 2026

(54) COMPOSITION, METHOD OF PREPARATION AND USE THEREOF, BASED ON A HARMLESS NATURAL ORGANIC MIXTURE FREE OF CONTAMINATION HAVING CHEMICAL AND PHYSICAL ASPECTS SIMILAR OR EQUAL TO ORIGINAL BEESWAX

(71) Applicant: David Isaac Alejandro Hidalgo Gonzalez, Algarrobo (CL)

(72) Inventor: David Isaac Alejandro Hidalgo Gonzalez, Algarrobo (CL)

( * ) Notice: Subject to any disclaimer, the term of this patent is extended or adjusted under 35 U.S.C. 154(b) by 1166 days.

(21) Appl. No.: 17/639,306

(22) PCT Filed: Oct. 8, 2020

(86) PCT No.: PCT/CL2020/000005
§ 371 (c)(1),
(2) Date: Feb. 28, 2022

(87) PCT Pub. No.: WO2021/035369
PCT Pub. Date: Mar. 4, 2021

(65) Prior Publication Data

US 2022/0312745 A1 Oct. 6, 2022

(30) Foreign Application Priority Data

Aug. 28, 2019 (CL) .................................. 2479-2019

(51) Int. Cl.
*C08L 91/08* (2006.01)
*A01K 51/00* (2006.01)

(52) U.S. Cl.
CPC .............. *A01K 51/00* (2013.01); *C08L 91/08* (2013.01); *C08L 2205/02* (2013.01)

(58) Field of Classification Search
CPC ........ A01K 51/00; A01K 47/04; A01K 47/00; C08L 91/08; C08L 2205/02; C08L 91/06;
(Continued)

(56) References Cited

U.S. PATENT DOCUMENTS 4,339,276 A 7/1982 Yokoyama et al.
4,500,359 A 2/1985 Woods et al.
(Continued)

FOREIGN PATENT DOCUMENTS

AR 014883 A1 11/2001
ES 2216210 T3 10/2004
(Continued)

OTHER PUBLICATIONS

Machine translation of RU 2669852 C2, originally published by Oct. 16, 2018 to Morss et al. (Year: 2018).*
(Continued)

*Primary Examiner* — Catherine S Branch
*Assistant Examiner* — Olga Lucia Donahue
(74) *Attorney, Agent, or Firm* — Maschoff Brennan

(57) ABSTRACT

A beeswax analogue composition enables efficient replacement thereof based on a harmless natural organic mixture free of contamination having chemical and physical aspects similar or equal to said wax. The composition includes microcrystalline wax, with a high percentage of hydrocarbon, branched, isoparaffinic and naphthenic hydrocarbons. The composition further includes and organic resin and macrocrystalline wax made of non-branched alkanes of non-fine crystals. Organic pigment determines the colour, distinguishing region, place and factory batch. A method of preparation includes pouring components into a steam-jacketed shell boiler for hot gases to simultaneously transfer heat to the entire mixture coming from an industrial burner with cross-over to medium or high-pressure liquefied gas.
(Continued)

Upon verifying total liquefaction of the components, from that moment the mixture reaches a temperature equal to or greater than 140° C. After 1 to 10 minutes, the burner is turned off and the mixture emptied into moulds for cooling.

4 Claims, 3 Drawing Sheets

(58) Field of Classification Search
CPC .......... C08L 91/00; A23L 21/00; A23L 21/20; A23L 21/25; A61K 8/92
See application file for complete search history.

(56) References Cited

U.S. PATENT DOCUMENTS

| | | | | |
|---|---|---|---|---|
| 5,063,271 | A * | 11/1991 | Jones | D21H 19/18 524/487 |
| 6,585,557 | B1 | 7/2003 | Remon et al. | |
| 2001/0002611 | A1 | 6/2001 | Ferrer Vidal | |
| 2001/0051680 | A1* | 12/2001 | Webster | C08L 91/08 524/307 |
| 2016/0326370 | A1* | 11/2016 | Paraszczak | C08L 91/06 |

FOREIGN PATENT DOCUMENTS

| | | | | |
|---|---|---|---|---|
| RU | 2669852 | C2 * | 10/2018 | C08L 57/02 |
| WO | 2013001116 | A1 | 1/2013 | |

OTHER PUBLICATIONS

Encaustic: Wax Block Qualities: Pigment: Transparency: Lightfastness [online], [capture from Sep. 18, 2020]. Retrieved from the internet: < URL: https://encaustic.com/wax-block-qualities-pigment-transparency-lightfastness/.> (Year: 2020).*

Garrido, L. et al., "Ensayo comportamiento de las abejas en cera organica inocue celda 4.9mm. Apiario Apicolandrea" pp. 9-18, Jun. 30, 2019.

* cited by examiner

COMPOSITION, METHOD OF PREPARATION AND USE THEREOF, BASED ON A HARMLESS NATURAL ORGANIC MIXTURE FREE OF CONTAMINATION HAVING CHEMICAL AND PHYSICAL ASPECTS SIMILAR OR EQUAL TO ORIGINAL BEESWAX

This Composition was created to assist apiculture by saving bees from their inexorable disappearance. Bees have resisted everything for over 100 million years, and in less than 50 years, we have reduced their population by a third. Later reports confirmed that the original beeswax in each hive is contaminated with pesticides, pathogens and organic waste. This evil causes bee populations to drop, since the species is unable to stay healthy long enough to achieve the potential required to preserve the species.

To simplify the name or identification of the Composition, we will call it "the invention" or "ILI" hereinafter.

STATE OF THE ART

Currently, there is nothing published that indicates, with any degree of certainty, a harmless wax medium similar to the Invention in which the bee can make its honeycomb or to help the industries that rely on bees, or the bees themselves.

The above statement reflects that we were unable to find, on the platforms consulted, information involving invention concepts that contain terms or ideas that are more or less similar to those proposed in the Application, simply because this is an absolute novelty; however, there is one document worth noting, Document U.S. Pat. No. 6,585,557B1; which discusses a synthetic or semi-synthetic substance that could be microcrystalline wax. This statement is not germane to analysing the document to find utility for the substance created because this document speaks of degrees Celsius, which cannot be warmer or colder depending on the tool used to measure them. In the case of the widely varying freezing and melting points, this Applicant finds this evaluation unsustainable; because in any temperature increase or decrease test, both occur at the same degree Celsius, which means that the substance is not accurately disclosed, or at least that the review was not rigorous. Despite this judgment, it is sufficient to ensure that it does not affect the novelty of the Application because it lacks pigment and organic resin.

Another, namely U.S. Pat. No. 4,500,359A, claims a substitute for beeswax, for which it lists a series of naturally occurring macro- or microcrystalline components from petroleum; but it does not state the organic resin component to collaborate in the structural stability of the mixture, nor does it infer a pigment to differentiate the final product.

There are others, not more than four, that could infer some concept related to honeycomb waxes; but they lack organic resins and pigmentation, meaning the novelty of the Application is not affected.

Details of the Technical Problems with the Original Wax and Possible Answers to Overcome them The set of contaminants—or one by itself—present in the original beeswax in the hives can be fatal to bees and harmful to the humans who use it; therefore, we will focus our attention on the aspects whose importance make it imperative to not only propose a solution, but find one; that is, what is plausible as a solution, namely, eliminate the original wax, as it is a deadly trap that is impossible to clean, and replace it with ILI.

Organic Waste

1. They rot, generating gases and liquids that weaken the honeycomb structure and undoubtedly cause harmful effects for any respiratory or digestive system. SOLUTION. ILI contains no organic waste.
2. They cause the hive to weaken and crumble. SOLUTION. ILI contains no gases or liquids
3. The bee wastes precious energy trying to salvage the situation by cooling the hive. SOLUTION Unnecessary, since ILI is dimensionally stable
4. They not only damage the bees' health but they also affect the second-use industries. SOLUTION It is harmless to the health of bees and humans.

Routine action by the beekeeper, as he himself favours the creation of another pesticide.

1. The beekeeper, for production purposes, melts and washes the wax, believing to clean it; it is then processed into sheets with a similar amount from any other hive; this thus mixes all the waxes, enhancing the power of the pesticides; when one pesticide is combined with another, it can form a third pesticide, perhaps causing an exponential function. A new, unknown poison with no name has been created. SOLUTION. Replacing the wax with ILI prevents this
2. Since the new (enhanced) poison is unknown and only kills, there is no liability for the death of the hive due to this new pesticide. SOLUTION. No need to seek culprits
3. Pesticides are not made harmless by the sun, air, water or time. Chromatography reports (like the ones cited and described in this Report) show that this is not the case. The same wax protects or preserves the active substances SOLUTION. With ILI, there is no risk of contamination.

Pathogens and risks when treating waxes to remove them; an impossible task

1. Treating waxes entails great risk. To kill the American foulbrood, assume that it stops being resistant in 30 minutes at 100° C. and in 11 minutes at 120° C. SOLUTION. Eliminates risks caused by the temperatures that it should reach
2. When can a beekeeper control the temperature in this way? And what tools could he use? SOLUTION. Replacing it with ILI is simple and affordable
3. A high temperature over 100° C. causes beeswax to break down. It crystallizes, making it unusable later. SOLUTION. No more waste.
4. How can a beekeeper know or be sure what devices to use to safely raise the temperature of a flammable substance? SOLUTION. No more dangerous "inventions"
5. How could a beekeeper know how to control and direct a flame to properly take advantage of the temperatures it produces? SOLUTION. This is no longer a concern Pollutants and a lack of understanding in every sector is leading to the disappearance of bees 1. There is no agreement on the reasons, despite the evidence. SOLUTION. ILI does away with the reasons and "solves the problem"
2. A lack of knowledge or other interests are silencing or concealing the reasons. SOLUTION. ILI dismisses explanations 3. The reduction in the number of bees mirrors the growth of the pesticide industry. SOLUTION Now, this industry will be able to partake in the Invention and help bees proliferate
4. The bee is poisoned starting in the egg. SOLUTION. Now, its life can be assured. The results of our tests guarantee it.
5. Pollutants are ingested and breathed when it uses its jaw to make a wax ball. SOLUTION.

No more ingesting and breathing poison As a summary of the state of the art we can reiterate that: the platforms indicated contain nothing involving a harmless honeycomb wax similar to the object of the Invention; nor do the comments in this Report originate therein, except for what is published by the Agricultural and Livestock Service of Chile (SAG). Reasons and comments in other writings (projects seeking financing for ILI, for example, published by this inventor) are empirical relationships, almost exclusively (if not entirely exclusively) to help to understand the technical problem that had to be solved. We address the issue of the Technical Advantages in the same way; which could never have been listed by this State of the Art, which, not even tangentially, ever involved anything related to the Object of the Invention.

Technical Advantages

A. Absolutely harmless
B. Its safety improves and preserves the hive's health and does away with the need for antibiotics (all of which are harmful) to attack mites and other pests, which saves directly on frequent expenses on remedial treatments.
C. It improves and prolongs the life of the bees, and increases honey productivity. The most important or direct data on the benefits of the Invention are contained in the conclusion of the test performed, which is explained in more detail at the end of this Descriptive Report. As a preview, we can state there is a decrease in Varroa of 50% and an increase in honey production of 35%, with the expectation of further improvements when the Invention is implemented over additional seasons as a measure to reverse the path to disaster.
D. Re-integrate the wax of hives with second-use industries, such as: base, insulation, addition, ignition, emulsion, protection, mould, lubrication, impregnation, combination, transfer, conservation, vehicle, coating, thickener, softener, texturizing or other when it is not used for more than two seasons or directly using it new, without having previously been used in a hive.
E. Dimensional stability is crucial in honeycombs. The Invention holds its structure without any signs of softening, crumbling or breaking due to extreme temperatures, to the weight of the honey under gravity or to violent forces (drops, earthquakes) This is thanks to its consistent, adhesive, flexible, elastic, malleable, moulding, and resistant composition.
F. It is made of pure hydrocarbon, the same as the original beeswax, with all its original characteristics in their most harmless state.
G. Permanent supply of components to make the mixture.
H. Manufacturing cost (raw materials and energy) within the margins of today's global original wax marketing, and potential financing for any manufacturer.
I. The net cost to beekeepers is zero due to I) reduced health costs and II) increased honey production of around 10 kilos per hive, yielding a simple income of USD 49 versus the cost of ILI at USD 11/kilo (Chilean dollar 7 Aug. 2019)

EXPLANATION OF THE INVENTION

In order to understand the Invention, we must understand the reason behind it and explain it by understanding what is happening in beekeeping worldwide. Beeswax is polluted such that the bee either dies outright or it has its health compromised, reducing its output and lowering its numbers. This situation worsens with each passing season as these pollutants build up in the wax.

How much more can the bee take before we reverse this trend?

The beekeeper is unaware of this reality, and if he were, he would be equally obligated to reuse the same wax to make the foundation of the honeycomb after harvest; there is no alternative.

The attached technical reports and the naked eye indicate that the original beeswax is a worsening toxic medium. Using the same unclean tools and storehouses every season, in every country, the beekeeper re-sheets the foundations, spreading the pollution, and despite this, he does not see the impact on the bee; he even does not think or realize that the organic waste from its decomposition softens the honeycomb again, causing them pernicious structural instability.

The test presented later indicates that pollution is the reason why bees are unable to defend themselves through their own efforts; they must be helped in their work and be made strong so they can have a chance at a life that we have taken away from them in such a short time, so they can proliferate and provide us their benefits.

Faced with a scenario difficult to understand and even more difficult to solve, this invention offers the solution for saving bees by creating a healthy environment within their hive that will return them their strength by simply replacing the current beeswax with a harmless substitute created with a natural organic mixture that is the same as the original wax.

DESCRIPTION OF THE FIGURES

Figures: Foundations or Sheets for the honeycomb

From 1 mm to 4 mm

Figure 1:
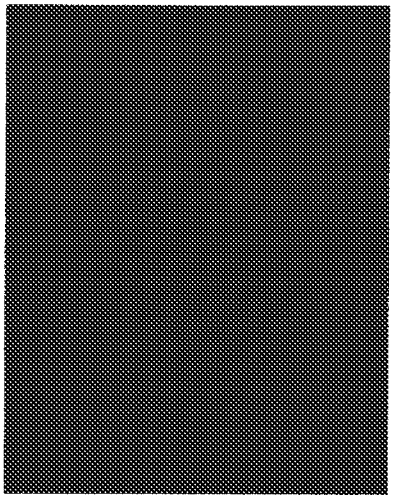
FIG. 1 Shows the stamped foundation with the typical hexagonal cell shape and common relief. The centre of the cell is the union of three cells on the backside. Its thickness, considering both reliefs, can reach.
Figure 2:
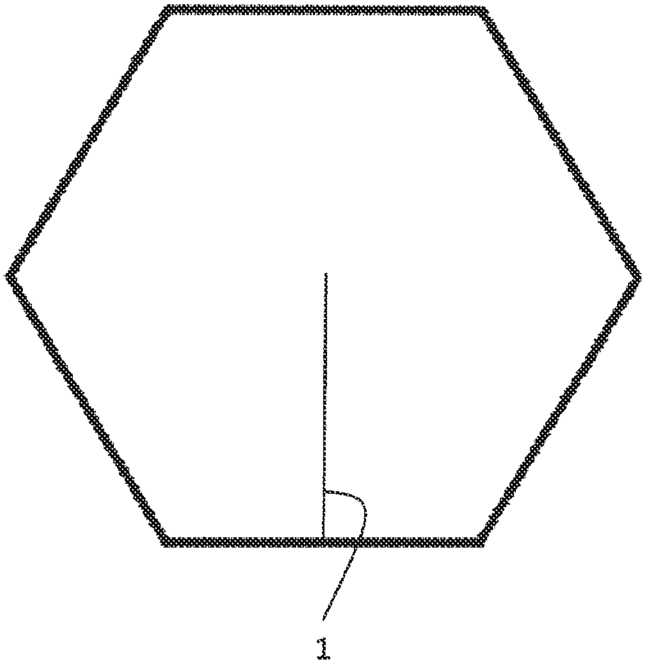

FIG. 2. Size of the cells; the size of the hexagon is given by a sum twice the value of the apothem.

1) From 2 mm to 4 mm

Figure 3:
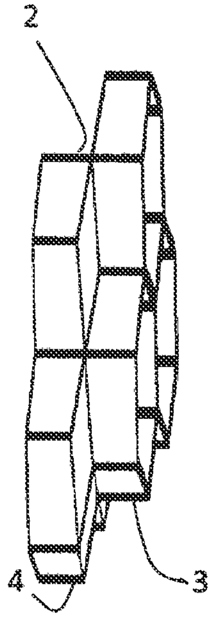
Figure 4:
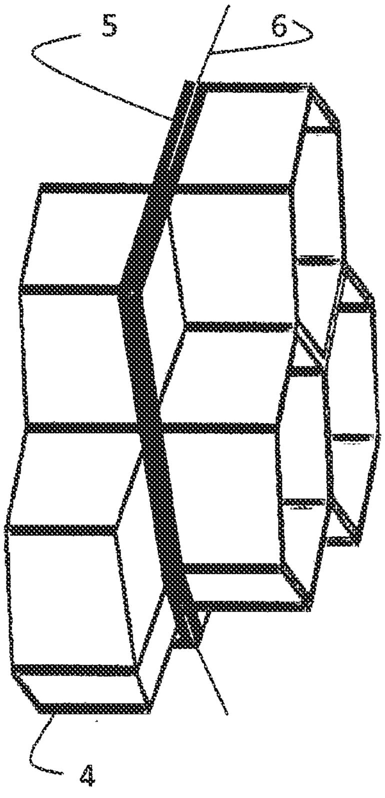
Figure 5:
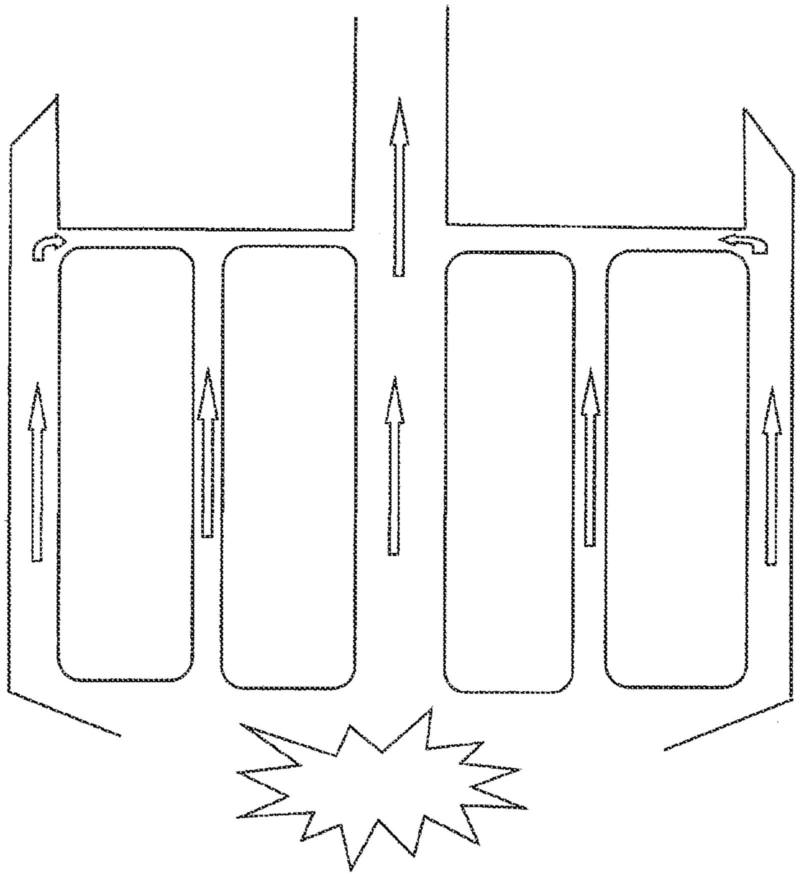

FIG. 3 Shows a side view of the foundation with slight stretching from the top of the relief, stamped on both sides, with two opposing cylindrical arrays, both faces equal 2) 1 mm to 4 mm Foundation thickness, with the maximum relief height of both sides
3) 0.3 mm to 1.5 Cell wall thickness mm
4) 0.1 mm to 2.5 Cell depth cell from the height of the relief to the height of the mm slight stretching, Equal front and back FIG. 4 Shows a side view of two foundations, with longer stretching of each from the maximum slight advance shown in FIG. 3, showing how they meet coming together on the smooth side (straight without stamping); union marked with a thick black line and its mid- and endpoint along the union, indicating the pairing of two foundations, marking the beginning of a honeycomb 5) 1 mm to 4 mm Sheet base thickness 6) Dotted line Joining of 2 foundations 4) 2.5 mm to 6 mm Depth of cell from height of slight stretching—FIG. 3—to the longest stretching FIG. 5 Shows a tubular pyro pot. Shape that provides the mixture the largest contact surface for heat transfer.

DETAILED DESCRIPTION AND TECHNICAL FEATURES OF THE INVENTION

A composition similar to beeswax that allows it to be replaced efficiently for beekeeping by all the industries that currently use it in their production processes and products; comes from a harmless and natural organic mixture free from contaminants and similar in chemical and physical aspects to the original beeswax. Comprises: Microcrystalline wax with a high percentage of branched isoparaffinic hydrocarbons and fine-crystal naphthenic hydrocarbons. Macrocrystalline wax of unbranched alkanes of non-fine crystals. Organic resin. Organic pigment. Microcrystalline wax with a high percentage of isoparaffinic (branched) hydrocarbons and naphthenic hydrocarbons, at percentages from 48.55% to 58.55%. Macrocrystalline wax of unbranched alkanes of non-fine crystals at percentages from 37.45% to 47.45%. Organic resin at percentages from 0.01% to 4%. Organic pigment at percentages from 0.0001% to 4%.

Its manufacturing process comprises the following steps, tools and actions, defined by the proportional weighing of components; verification of the aseptic state of the machines and tools, after which the components are poured into a steam-jacketed shell boiler so the hot gasses can simultaneously transfer the heat to the entire mixture, which is heated with a medium to high pressure liquefied gas industrial burner by means of thermal radiation. Once the total liquefaction of components is verified; let the mixture reach a temperature of between 135° C. and 145° C. Wait 1 to 10 minutes, turn off the burner and empty the mixture into moulds for cooling. After the first batch, with the equipment still hot, the second and subsequent batches go from raw material to liquefied product in 25 to 35 minutes, then start counting again from 1 to 10 minutes at 140° C. at the previous temperature for a uniform product.

With regard to the process for making the composition, any method or tool can be used with any fuel that produces energy to heat gas or liquids flowing through tubes, radiators or plates through the mixture being made.

The composition process reaches its homogenisation or uniformity when held between 135° C. and 145° C. for 1 to 10 minutes. Quickly heating the entire mixture simultaneously avoids the risk of crystallization. In this regard, it should be noted that the time and energy cost make it so the resulting product is within the market values of beeswax The composition has a freezing temperature between 55° C. and 65° C. at 57 and 77 metres ASL, +/−10 metres. It is also not destroyed or damaged between 40° C. and −25° C.; this means it does not become sticky, turning into a shapeless mass or breaking due to low temperatures.

Having obtained the composition, it can be used to replace the beeswax as a foundation for breeding them, to store honey and pollen; to replace the foundations of the honeycomb along the width and length of rack hives with four sides or top bar; for the varieties: Langstroth, Dadant, Lusitana, Warre, Layens, Top Bar Hive or Tanzania, Top Bar Hive or Kenniana, Carlini, Albacete or other varieties that are classified and unknown due to being unpublished and other non-classified disc, triangular, rhomboidal, elliptical, pyramidal, pentagonal, hexagonal, heptagonal, octagonal shapes or with irregular measurements; made of wood, cardboard or paper, cork, glass, clay, textiles or plants, acrylic, synthetics, ceramic, cement, plastics or wild. Similarly, its use can replace beeswax in the processes and products of second-use industry as a base, insulation, additive, ignition, emulsion, protection, mould, lubrication, impregnation, combination, transfer, conservation, vehicle, coating, thickener, smoothing agent, texturizing agent or other, after having been used in the hives and in the same way as above, new; that is, without having been used in a hive previously. These foundations can be made for honeycomb with hexagon cubicles or cells for the young and their products like honey only for relief with no stretching; with slight stretching from the relief, with longer stretching from the slight stretching.

The composition is dimensionally stable and self-supporting; it does not deform and remains structured, consistent, adhesive, flexible, elastic, mouldable, malleable and resistant, even at times of abnormal temperature of the medium that causes softening or freezing. It is easy to turn into a foundation for honeycombs or for any use as an emulsion, for example. It is not destroyed or damaged between 40° C. and 45° C. (the foundations do not stick to each other, no matter how many are stacked). When used as foundation, it remains flexible to −25° C. under extreme bending forces (touching one tip to the other at the opposite end). This mixture of natural substances contains oils in a minimum non-risky proportion (understood to be unsuitable for attaching) from <0.5% to 1.5%, it is grease free and does not emit vapours.

Reiterating previous data and concepts, we have to say that any invention whose composition relies on abundant, affordable and easy to acquire elements is useless if the process for making the mixture takes a long time and requires excessive energy. This statement is related to the Dimensional Stability of ILI, which is discussed below.

Its homogenisation or uniformity is the state sought. This process requires technique and time, as this is what determines the dimensional stability of the original beeswax, which is the main feature this Invention seeks to replicate and which allows it to maintain its structure when used as a honeycomb. This Dimensional stability can only be acquired when the specified temperatures are held for the required times in each sector of the mixture.

In fact, this feature is the most relevant for the honeycomb to remain self-supporting inside the hive in extreme temperatures, under full honey load or sudden movements (strong tremor).

It is thus essential for the complete mixture to acquire the temperature indicated in the shortest possible time and with the minimum energy expenditure; to put it simply, uniformly and instantaneously throughout the mixture.

This speed, so necessary for the economic value and the proper characteristics of the composition, is achieved when the ENTIRE liquid mixture receives equal heat at the same time.

This heat can be provided in several ways; in the case of the Invention, a jacketed pot with pyro tubes, as explained below:

Pot surrounded by a jacket that extends from the end to below the bottom to form a wide chamber at the base where the energy from the industrial, medium-pressure liquefied gas cross burner is produced and directed upwards. From the bottom of the pot emerges a main tube that extends beyond the edge of the pot, +/−14 cm outside the pot, and several smaller diameter satellite tubes that connect to the main tube above and before the maximum mixing level; similarly, in order to allow hot gas circulation between the outer wall of the pot and the jacket, a pair of pyro tubes with a much smaller diameter than before have to be connected to the main tube above and before the maximum level of the mixture, just like the satellite tubes.

As for burning, explosions and spills during the manufacturing process, given the nature of the components of the mixture, this process omits an explanation, since the safe ways to process them correspond to other subjects in other areas or other industries where the state of the art is extensive and may include a version of inventions, methods or initiatives that have nothing to do with ILI.

Second-use industries, so-named by this Applicant, are those that use wax in their processes that comes directly from hives. This has been common practice in many of them. Today, these industries reject beeswax due to excessive contamination, with more losses for beekeeping. The mix of the Invention, since it lacks contaminants, solves this problem because these same industries can use ILI directly from the first use.

Chromatographic and Other Reports on Contaminants

The following chromatographic reports involving the original beeswax and the Invention are not published. They were commissioned and financed by the applicant.

A/ Original Beeswax—Shows Presence of Pesticides
- Analab Chile S.A. Commissioned by the Applicant David Hidalgo González
- Report No. 523088 of 16 Sep. 2016, indicating:
  - 0.010.32 mg/kg ACRINATHRIN
  - 0.010.27 mg/kg CYPERMETHRIN
  - 0.01<0.030 mg/kg PHENPYROXIMATE
  - 0.010.034 mg/kg METOXIFENOCIDE
  - 0.01<0.030 mg/kg QUINALPHOS
  - 0.01<0.030 mg/kg TEBUCONAZOLE
  - This, for the first time, confirms that the theory is a reality.

B/ Original Beeswax—Shows Presence of Pesticides
- Analab Chile S.A. Commissioned by the Applicant David Hidalgo González
- Report No. 527363 of 24 Oct. 2016, indicating:
  - 0.01 20 mg/kg ACRINATHRIN
  - 0.010.12 mg/kg COUMAPHOS
  - The concentration of acrinathrin revealed by the report indicates the extraordinary seriousness of the situation. This report was for a test conducted by the applicant and inventor of ILI, which consisted of sending to the laboratory a mix of 90% harmless wax (from the invention, in the early stages) and 10% original beeswax taken at random from the Comalle Curicó area. The SURPRISING result indicated that the bees only die. That is, with just 10% of original beeswax taken at random, it contaminated the 90% harmless wax. How much poison is a bee exposed to from its time in the egg?

C/ Original Beeswax—Shows Presence of Pesticides
- Analab Chile S.A. Commissioned by the Applicant David Hidalgo González
- Report No. 579158 of 27 Mar. 2018, indicating
  - 0.01<0.030 mg/kg (ppm) ACRINATHRIN
  - 0.011.3 mg/kg (ppm) COUMAPHOS
  - 0.01<0.030 mg/kg (ppm) IPRODIONE
  - 0.010.093 mg/kg (ppm) TAU-FLUVALINATE
  - The test was done by extracting a few wax foundation sheets from Colmenares Suizos, in the Paine area of metropolitan Chile. Colmenares Suizos is a professional stamper that combines wax from several apiaries to make the operation of its systems economical. It is recognized as a company that meets the specifications of the SAG standards. This inventor will withhold comment because he does not understand the parameters of the SAG.

D/ ILI Wax—Absence of Pesticides
- Analab Chile S.A. Commissioned by the Applicant David Hidalgo González
- Report No. 523089 16 Sep. 2016
- The first one to indicate a lack of pesticides in a wax for honeycombs was named FREE BEE WAX, whose name today is ILI E/ ILI Wax—Absence of Pesticides
- Analab Chile S.A. Commissioned by the Applicant David Hidalgo González
- No 606972 of 22 Jan. 2019
  - Requested for ILI self-check F/ ILI Wax—Absence of Pesticides
- Analab Chile S.A. Commissioned by the Applicant's spouse
- No 614093 of 29 Mar. 2019
  - Requested to confirm that ILI is still created innocuously.

Important Note: Based on the tests performed, we can say that on the same day, 16 Sep. 2016—Reports No 523088 (first) and No 523089, results were obtained from two samples; one with a positive result and the other negative. This action tests the scientific expertise of Analab Chile S.A. in order to corroborate its effectiveness. The laboratory's science personnel could not have known which one was contaminated or not, or if one was harmless.

Multiple notes and miscellaneous publications on contaminants refer to: The presence of pathogens visible to the naked eye or through activities of the SAG of Chile on its WEBSITE. In the same way, it is possible to see organic remains with the naked eye; these remains, when they decompose, cause the honeycomb to weaken by generating gases and liquids. They are undoubtedly also responsible for the poor health of bees and humans.

Results of the Composition
- It can be manufactured to be used in all types of foundations for any type of hive. Foundation only with relief or with minor or considerable stretching
- This can be of help to second-use industries since the foundation can be made new each time
- As proof of its safety, a chromatographic analysis can be performed to check for harmful traces
- It lacks gases and liquids from decomposition, keeping bees from breathing noxious gases and ingesting harmful liquids
- It does not soften or break in extreme temperatures. It does not distort dangerously, preventing the bee from making an effort by aerating due to the honeycomb softening inside the hive.
- It makes it easier for every egg laid by the queen to become a healthy bee
- It does not crystallize at high temperatures
- It makes it possible to make all types of shapes, and accompany any product in its formation or presentation
- The substances that make it up are affordable, easy to obtain, simple to make and, based on the production results, the purchase cost can be more than offset by the increased yield from a hive, as proven by the results of the test below, which was commissioned by the Applicant.

Presentation of the Test

The test is presented below. It was important to conduct it in order to put into practice (back then) the utility and effectiveness of three (3) important aspects:

ONE, Reaction of the bee and the potential improvement of its health, evident with the naked eye due to the agility of its movements as it flies over the hive and other aspects that are known or perceived only by the beekeeper, given their proximity to their "friends"—although with no scientific explanation—and that can be perceived as indicators of good health, such as the sounds that the bee emits as a whole or agility of its flights TWO Reduction of the Varroa mite THREE, Honey yield Bearing in mind that there may be other positive aspects, such as reducing other pathogens, which is not possible to confirm except through microscopic observations and laboratory tests, and with the continued use of ILI, the test begins without explaining to the beekeeper (who performs the test) that it is ILI, as it was then known, with all its benefits; this, with the sole purpose of pushing positive values; but, in addition, in order to ensure that interested third parties are able to impede the successful development of this invention. The beekeeper was only told that it was wax "washed" of organic residues and pesticides to the point that it was possible to render it harmless, and to keep the results secret until the date specified.

Test

Behaviour of Bees in Harmless Organic Wax 4.9 mm CELL

Apicolandrea apiary

Conducted by LUIS MAURICIO GARRIDO GONZALEZ OWNER OF APICOLANDREA APIARY

Requested by David I. A. Hidalgo González, Creator of ILI natural organic harmless wax Location of the Test Apiario Apicolandrea 1500 Colmenas Comalle, Curicó Chile Its reproduction in whole or in part, by any means, verbal or visual, is prohibited without the explicit authorisation of the author and applicant. 30 Jun. 2019

1 INTRODUCTION

Purpose: Determine the Behaviour and Development of the Bee in a Foundation of Natural, Harmless, Natural Wax with a Cell Size of 4.9 mm to See Differences V/S Original Wax HEREINAFTER: wax 4.9 mm On 20 Aug. 2016, two (2) hives are chosen to prepare them according to the test process Hive One: frames with traditional wax, cell size 5.1 mm Hive Two: 4.9 mm wax frames Beekeepers have always prepared the frames for their hives with wax contaminated with pesticides, pathogenic microorganisms and organic residues that harm and kill the bee, and pollute the products it produces. The aim is therefore to develop a solution to this problem. This test was conducted with wax foundations with a 4.9 mm cell provided by Mr David Hidalgo González—hereinafter 4.9 mm WAX—which was used to prepare Hive Two. The goal was to see if it was possible to reduce Varroa infestations, have healthier births, measure production and see if other positive and significant aspects could be identified with the naked eye.

4.9 MM WAX promises two specific characteristics to take advantage of: 1. Safety and 2. Varroa control (because of the 4.9 mm cell size, the parasites vibrate, alerting the bees to their presence, who then remove them)

We are also driven by the idea and hope that we are providing an opportunity to improve the health of the bee, considering both characteristics. It is therefore likely to give the bee a life that is healthier and more productive, by not being exposed to the danger of contaminants from the egg to the larval stage.

Aids in controlling the Varroa population inside the hive. The 4.9 mm size of the cell makes the Varroa mite uncomfortable, making it emit vibrations that the bees can detect, and due to their hygienic behaviour (self-preservation, very likely), they break the larval sac and extract the larva they believe to be defective, thereby eliminating several mites and their harmful offspring.

2 PROCESS

Preparation of Hives to be Evaluated

Hive with Traditional Wax 5.1 mm

All its frames are removed, leaving the bees and queen, simulating a swarm. Then nine (9) frames are positioned with traditional 5.1-mm printed cells plus a feeder.

Hive with Wax 4.9 mm

The frames are removed, again leaving only the bees and their queen, simulating a swarm and positioning nine (9) frames with 4.9 MM WAX plus a feeder.

Once the frames are changed out, a feeder is introduced in both hives with 1.5 litres of liquid sugar in each. The goal is to encourage bees to stretch the wax and for the queen to start laying eggs.

Visits

30 Aug. 2016 first visit

Hive with Traditional Wax 5.1 mm

Wax stretching is observed at 65% of the total, with nectar storage, pollen and egg-laying by the queen. This indicates normal colony development.

Hive with Wax 4.9 mm

We see wax stretching of 50% of the total, with a slight disorder in the configuration of the cells. As in the previous case, the hive has nectar storage, pollen and queen egg-laying.

Observation

In the hive with 4.9 mm wax, a disorder was identified in the cell stretching, which was due to the size of the new cell. Since the bees are smaller, they have to go through a process—albeit very fast—of adaptation to achieve the ultimate goal of uniformly stretching out the cells.

1.5 litres of liquid sugar is deposited in the feeder of each of the hives.

30 Sep. 2016 second visit

Hive with Traditional Wax 5.1 mm

Hive with 100% frame stretching; with nectar, pollen and egg-laying in different developmental states.

Hive with Wax 4.9 mm

Hive with 90% frame stretching; with nectar, pollen and egg-laying in different developmental states.

Observation

Both hives are practically developed. Specifically, Hive One at 100% and Hive Two at 90%. In the hive with 4.9 mm wax, the cells were in disarray in all the frames, and as the frames were fully stretched out, this disorder decreased.

With both hives developed, we are in a position to start defining, in the next visits, the percentages of Varroa infection, birth of nursing bees and general behaviour.

30 Sep. 2016 (same-day visit)

Varroa Sample

Step I

Hive with Traditional Wax 5.1 mm

Sampling is done on 200 bees using a glass with 85% alcohol; the glass is covered and allowed to stand to kill the Varroa so it detaches from the bee. We then separate the bees from the mites; the numbers of bees and Varroas present are counted, then a simple rule of three yields the percentage of infection. In this case, the result was 5.7%.

Hive with Wax 4.9 mm

As in the previous case, sampling was done to see the percentage of Varroa infection in the hive, which yielded a result of 5.3%.

Observation

The level of Varroa in both hives was practically the same. This is because a large percentage of the bees sampled were adult, meaning they were already in the hive before using the 4.9 mm wax. For the next visits, we expect the bees sampled from Hive Two to have been born in the 4.9 mm wax.

Varroa Sample Varroa Control

Step II

16 Oct. 2016 third visit

To see the actual results of the benefits of 4.9 mm wax, we will check both hives for Varroa so that the next checks and samples reflect the actual percentages of Varroa infection, observing new and old bees born from the first brood and after.

The Treatment.

With vapourised oxalic acid applied by a sublimator for about 15 to 20 seconds per hive, repeated three days in a row (16, 17 and 18 October).

Once the treatment is complete, the hives will be sampled for Varroa again.

20 Oct. 2016 fourth visit

Varroa Sample

First Varroa Sample Post-Treatment

Step III

Analysis of approximately 200 bees placed in a glass with 85% alcohol, left covered until the Varroa die and detach from the bee. The bees are then separated from the mites and are counted separately, yielding the following results.

5.1 mm Wax 0.8% 4.9 mm Wax 1.2%

Observation

The checks of the Varroa mite showed a considerable decrease in both hives. These indicators will be the basis for differentiating one of the attributes of the safe 4.9 mm wax.

In both, we see almost the same number of mites. It is also visually apparent that there are wingless bees in the 5.1 mm hive. A frame-by-frame count revealed 4 wingless bees.

In the hive with 4.9 mm wax, no wingless bees were observed.

5 Nov. 2016 fifth visit

Both hives are strong and in need of more space, so the feeder was pulled out and a super was installed.

Wingless bees are still observed in the 5.1 mm wax hive. This is because the Varroa, when it enters the cell, feeds on the developing individual (before hatching), causing some of the bees to be born without wings.

15 Nov. 2016 sixth visit

Hive with Traditional Wax 5.1 mm

The hive is strong, with four honey frames in the super and an increase in the number of bees.

Hive with Wax 4.9 mm

The hive is strong, with seven honey frames in the super, and visually more active bees compared to the hive with 5.1 mm wax.

Observation

Increased honey production in the hive with 4.9 mm wax; this is because the bees have developed in a safe environment, so it is reasonable to conclude that bees born in a place free from pesticides and a low percentage of parasites will be healthier, stronger and more productive.

30 Nov. 2016 seventh visit

Varroa Sample

Second Varroa Sample Post-Treatment

Step IV

Percentage of Varroa Infection 5.1 Wax 1.4% 4.9 Wax 1.2%

Wingless 5.1 Wax 4.5% 4.9 Wax 1.0%

Observation

We can see a difference. There are more mites in the wax with 5.1 mm than in the hive with 4.9 mm wax, where the percentage was consistent. Here we begin to see the two great benefits of this 4.9 mm wax.

Since it is a safe, organic wax, the bee is born in a pesticide-free environment, allowing for a better bee in every sense of the word.

This is proven when the mites are hindered with cells that disturb them; that is to say, the environment is not optimal for its development since it needs room inside the wax cells. Because it is narrower, in the 4.9 mm cell, it emits vibrations; they are then removed when the bees get rid of the infected larvae.

15 Dec. 2016 eighth visit

Hive with Traditional Wax 5.1 mm

The hive was checked, and the number of frames with honey was observed to be eight (8)

Hive with Wax 4.9 mm

The hive was checked and the number of frames with honey had increased from seven (7) to ten (10), completely filling the super and requiring the installation of another super so as to let the hive continue to produce nectar and grow.

Observation

We clearly see that the honey production in the hive with 4.9 mm wax is much higher; this indicates that the bees are stronger and healthier compared to the ones in the hive with 5.1 mm wax.

25 Dec. 2016 ninth visit

Hive with Traditional Wax 5.1 mm

The hive filled all the frames in the super with honey, so another super was installed to continue collecting nectar.

Hive with Wax 4.9 mm

A check of the second super revealed that seven frames were full of nectar

Observation

Noticeable difference in honey production between the hive with 5.1 mm wax and the one with 4.9 mm wax.

10 Jan. 2017 tenth visit

Honey Harvesting

Hive with Traditional Wax 5.1 mm

Come harvest time, the hive has 1 super and 2 frames of honey, yielding 16.9 kg of final product.

Hive with Wax 4.9 mm

The 4.9 mm wax hive at harvest time has two (2) supers filled with honey, yielding a final production of 26 kg Observation The difference in production is remarkable, with the 4.9 mm wax hive producing 35% more honey than the 5.1 mm wax hive.

10 Mar. 2017 eleventh visit

Final Varroa Sample

Repeating the process to count the Varroa infection shows the percentages indicated in the graph Hive with Traditional Wax 5.1 mm 3.8%

Hive with Wax 4.9 mm 1.8%

Observation

Finally, in light of the honey production, the two hives are sampled one last time to determine the number of Varroa present in each. The data in the graph show that the percent infection in the 4.9 mm wax hive remains low due to the size of its cells and its harmless composition.

3 CONCLUSION a) Through the study conducted between August 2016 and March 2017, it was concluded that the 4.9 mm wax is superior to the traditional wax 5.1 mm in the categories in question.

b) Based on this test, the 4.9 mm wax reduces the amount of Varroa present in the hive by 50%. This allows the individuals born to be stronger, healthier and more productive.

c) Because of its benefits, the use of 4.9 mm wax resulted in a honey yield that was 35% higher than in the hive with 5.1 mm wax.

4 FINAL COMMENT

Does the cell size make the Varroa vibrate because it is uncomfortable? Or does the Varroa always vibrate, but the weakened bee is unable to detect it and drag out the "defective" larva to remove it from the hive? The ongoing use of ILI in subsequent seasons should be able to settle this. Its creator thinks that the hive should grow stronger due to the better health and the constant use of the harmless 4.9 mm wax. We already know that the bees are stronger and healthier, with fewer Varroa mites and more honey.

The invention claimed is:

1. A beeswax analogue composition, comprising:

a) a microcrystalline wax with isoparaffinic (branched) hydrocarbons and naphthenic hydrocarbons, at percentages from 48.55% to 58.55% by weight of the total composition;

b) a macrocrystalline wax with unbranched alkanes, at percentages from 37.45% to 47.45% by weight of the total composition;

c) an organic resin at percentages from 0.01% to 4% by weight of the total composition; and d) an organic pigment at percentages from 0.0001% to 4% by weight of the total composition.

2. The composition according to claim 1, having a solidification (freezing) temperature between 55° C. and 65° C. when measured at an altitude between 57 and 77 metres above sea level (ASL), +/−10 metres.

3. The composition according to claim 1, wherein the composition is not destroyed or damaged when in an environment having a temperature between 40° C. and −25° C., and does not become sticky, turning into a shapeless mass or breaking due to low temperatures.

4. The composition according to claim 1, wherein the composition remains flexible in an environment having a temperature as low as −25° C.

* * * * *